(12) United States Patent
Johnston

(10) Patent No.: US 8,029,854 B2
(45) Date of Patent: Oct. 4, 2011

(54) CONCRETE REPAIR PROCESS

(75) Inventor: Jay A. Johnston, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 848 days.

(21) Appl. No.: 11/881,211

(22) Filed: Jul. 26, 2007

(65) Prior Publication Data
US 2009/0029042 A1   Jan. 29, 2009

(51) Int. Cl.
B05D 3/00 (2006.01)

(52) U.S. Cl. .............. 427/140; 404/47; 404/64; 404/66; 404/74; 428/40.3; 428/352; 428/489

(58) Field of Classification Search .................... 528/28; 427/140; 404/47, 64, 66, 74; 428/40.3, 352, 428/489
See application file for complete search history.

(56) References Cited

U.S. PATENT DOCUMENTS

| | | | |
|---|---|---|---|
| 4,939,191 A * | 7/1990 | Kataoka et al. | 524/5 |
| 5,759,695 A | 6/1998 | Primeaux, II | 428/425.5 |
| 5,827,008 A * | 10/1998 | Smith et al. | 404/47 |
| 5,962,144 A | 10/1999 | Primeaux, II | 428/425.5 |
| 6,376,579 B1 | 4/2002 | Mishra et al. | 523/466 |
| 6,875,500 B2 | 4/2005 | McGrath, Jr. | 428/213 |
| 6,998,459 B2 * | 2/2006 | Roesler et al. | 528/28 |
| 2002/0010250 A1 | 1/2002 | Shen | |
| 2005/0137323 A1 | 6/2005 | Roesler et al. | |
| 2005/0215701 A1 | 9/2005 | Porsch et al. | |
| 2005/0245716 A1 | 11/2005 | Jansen et al. | |

* cited by examiner

*Primary Examiner* — Michael Cleveland
*Assistant Examiner* — Xiao Zhao
(74) *Attorney, Agent, or Firm* — Robert S. Klemz; John E. Mrozinski, Jr.; Noland J. Cheung

(57) ABSTRACT

The present invention provides a process for repairing concrete involving filling one of a void, gap or seam in the concrete with a polyurethane sealant containing a silane terminated prepolymer ("STP"), and a catalyst, optionally, one or more of plasticizers, fillers, pigments, drying agents, light stabilizers, antioxidants. thixotropic agents and bonding agents and applying an isocyanate-terminated prepolymer containing polyurethane or polyurea coating to the silane terminated prepolymer polyurethane sealant.

18 Claims, 1 Drawing Sheet

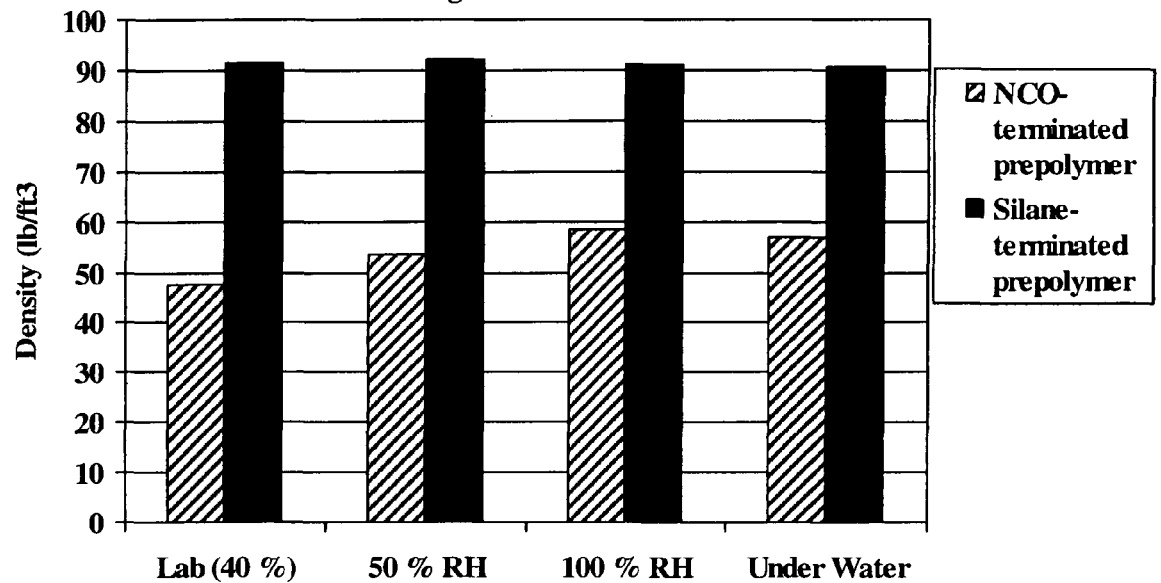
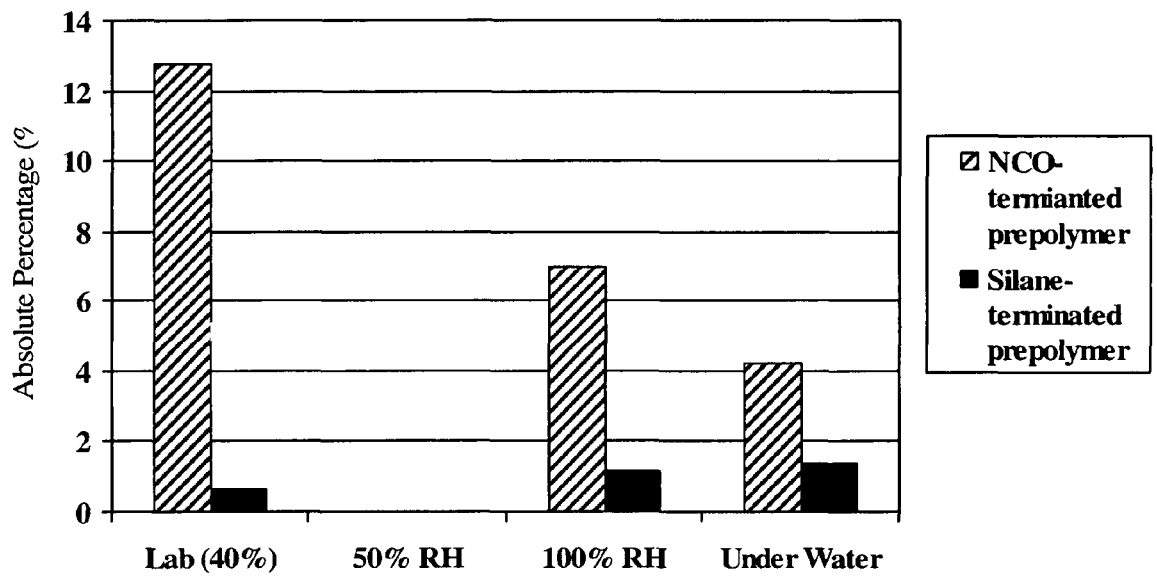

CONCRETE REPAIR PROCESS

FIELD OF THE INVENTION

The present invention relates in general to concrete repair, and more specifically, to a process involving applying to the concrete a sealant containing a silane-terminated prepolymer before application of a polyurethane or polyurea coating containing an isocyanate-terminated prepolymer.

BACKGROUND OF THE INVENTION

Fast-reacting polyurea coatings cannot be applied directly to concrete surfaces which contain defects called "bug holes". Bug holes are small regular or irregular cavities resulting from trapped air bubbles in the surface of formed concrete during its installation. Such bug hole defects may be found in both new and old concrete. When the bug hole is overcoated with a polyurea coating during repair processes, the gas trapped under the coating is heated by the exothermic polyurea coating. The expanding gas causes the coating to bubble producing a mushroom shape or a hole in the coating (if the bubble breaks). This hole must be patched and recoated.

Workers in the art have tried many approaches to repair bug holes before coating with polyurea. Epoxy primers, polyurethane/castor oil primers and latex primers have all been tried.

For example, U.S. Pat. Nos. 5,759,695 and 5,962,144, both issued to Primeaux, II, disclose polyurea elastomer systems which are said to have improved adhesion to a substrate with the use of a primer that is applied first. The primer is made of a hydrophobic, primary hydroxyl-containing compound, for example, castor oil, and an isocyanate. Primeaux, II states that it is not necessary to wait for the primer to cure prior to applying the polyurea elastomer system. The primer system is said to be particularly useful on wet substrates, where the primer penetrates the substrate prior to polyurea elastomer spraying.

Mishra, et al., in U.S. Pat. No. 6,376,579, report an epoxy composition said to be especially designed for use as a primer for sealing and filling small pores in concrete. Mishra, et al. state that their composition is a low temperature curing, sag-resistant epoxy primer, which provides good adhesion to concrete and to a polyurea coating applied to the primed concrete. Their epoxy primer is said to be curable at a temperature below 40° F. and is an admixture of two parts, Component A and Component B; in which Component A is a crystallization resistant reactive epoxy resin and Component B is an amine curing agent. The resulting primer bonds to concrete at 200 psi or greater, when measured by ASTM D 4541.

U.S. Pat. No. 6,875,500, issued to McGrath, Jr., discloses a flexible flooring system for floors exhibiting surface movement, and/or for cushioning hard floors, which includes an epoxy or polyurethane primer, a two-component ambient temperature cured polyurethane membrane substrate base atop the primer of a urethane grade castor oil, polyether based polyol, a tin catalyst and a thickening agent, along with a polymeric isocyanate activator, and a polyurethane or polyurea, aromatic or aliphatic coating atop the substrate base. The flooring system of McGrath, Jr. is said to provide a very tough, but flexibly soft non-cracking overlay which moves with the floor.

Primers have been shown to reduce the surface porosity and reduce the blistering of a subsequently applied coating. However, a thin coating of a primer usually does not solve the problem of bug holes, because although the primer coats the holes and reduces the porosity of the substrate, deep holes usually remain in the substrate. Thus, the application of a coating still results in a trapped pocket of gas in the deeper holes.

Another option is to use a sealant made with an isocyanate-terminated prepolymer to patch bug holes and fill seams in the concrete. However, if such a sealant is applied to wet concrete or used in high humidity conditions, the prepolymer likely will react with water. The isocyanate/water reaction produces carbon dioxide gas as a side product. Therefore, bubbling or foaming of the sealant may occur.

Thus, a need exists in the art for a process for coating or sealing concrete in restoration and repair processes. The process should be capable of repairing bug holes and filling seams in wet concrete and/or in high humidity environments.

SUMMARY OF THE INVENTION

Accordingly, the present invention provides such a process for repairing and restoring concrete with a sealant made from a silane-terminated prepolymer. The inventive process can be used to patch bug holes and/or fill seams in concrete. The improvement over the current processes, which use an isocyanate-terminated prepolymer containing sealant, is the lack of gas evolution due to the presence of a silane-terminated prepolymer in the sealant. No bubbles form in or under the sealant in the inventive process.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein:

FIG. 1 shows sealant densities at various relative humidity levels; and

FIG. 2 illustrates the variability of sealant densities at various relative humidity levels.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a process for repairing concrete involving filling one of a void, gap or seam in the concrete with a polyurethane sealant containing a silane terminated prepolymer ("STP"), and a catalyst, optionally, one or more of plasticizers, fillers, pigments, drying agents, light stabilizers, antioxidants. thixotropic agents and bonding agents and applying an isocyanate-terminated prepolymer containing polyurethane or polyurea coating to the silane terminated prepolymer polyurethane sealant.

The present invention also provides a process for repairing concrete involving filling one of a void, gap or seam in the concrete with a polyurethane sealant containing a silane terminated prepolymer ("STP"), and a catalyst, optionally, one or more of plasticizers, fillers, pigments, drying agents, light stabilizers, antioxidants. thixotropic agents and bonding agents, allowing the polyurethane sealant to cure and applying an isocyanate-terminated prepolymer containing polyurethane or polyurea coating to the cured silane terminated prepolymer polyurethane sealant.

Among the advantages of using a silane-terminated prepolymer containing sealant in the inventive process are that it can be applied to wet concrete and there is no evolution of gas or volatile organic compounds (except methanol) during cure. Another advantage is the relatively short time before a post-coating operation may commence. A third advantage is that the silane-terminated prepolymer containing sealant in the inventive process can be a one component material.

Silane-terminated polyurethane prepolymers ("STPs") suitable for inclusion in the polyurethane sealants useful in the processes of the present invention are disclosed e.g., in U.S. Pat. Nos. 5,364,955; 6,001,946; 6,265,517; 6,545,087; and 6,887,964. Alkoxysilane-functional polyurethanes that crosslink via silane polycondensation are well-known to those skilled in the art. A review article on this topic may be found in "Adhesives Age" 4/1995, page 30 ff. (authors: Ta-Min Feng, B. A. Waldmann). Particularly preferred alkoxysilane prepolymers for use in the inventive process may be made according to U.S. Published Patent Application No. 2007/0055035.

After the silane-terminated prepolymer containing sealant has been applied and cured, the cured sealant may be preferably be overcoated with an isocyanate-terminated prepolymer containing polyurethane or polyurea coating as known in the art. Alternatively, an isocyanate-terminated prepolymer containing polyurethane or polyurea spray coating may be applied before the sealant is completely cured.

Preferred polyurethane coatings may be produced from the reaction product of an isocyanate-terminated prepolymer and a resin blend component. The prepolymers are made with a hydroxyl-terminated polymer resins. The resin blend component contains hydroxyl-terminated diol, triol or polyols, and/or hydroxyl-terminated chain extenders The resin blend may also contain additives, and preferably one or more catalysts. Polyurethane coatings may be produced by a variety of processes which are well documented in the patent and scientific literature.

Preferred polyurea coatings may be produced from the reaction product of an isocyanate component and a resin blend component. The isocyanate may be aromatic or aliphatic and may be a monomer, a polymer, a quasi-prepolymer or a prepolymer. The prepolymer, or quasi-prepolymer, can be made of an amine-terminated polymer resin, or a hydroxyl-terminated polymer resin. The resin blend preferably contains amines, and/or amine-terminated chain extenders. Preferably, the resin blend component does not contain catalysts. Polyurea sealants may be produced by a variety of processes which are well documented in the patent and scientific literature.

The silane-terminated or isocyanate-terminated prepolymers may be formulated with customary plasticizers, fillers, pigments, drying agents, additives, light stabilizers, antioxidants. thixotropic agents or bonding agents, and optionally with other adjuvant substances and additives, for the production of the sealants useful in the inventive processes.

Calcium carbonate may optionally be included in the sealants preferably in an amount of from 30 to 70 wt. %, and more preferably from 40 to 60 wt. %. The calcium carbonate may be present in the sealant in an amount ranging between any combination of these values, inclusive of the recited values.

Examples of other suitable fillers for use in the sealants include carbon black, precipitated hydrated silicas, mineral chalk materials and precipitated chalk materials. Examples of suitable plasticizers include phthalic acid esters, adipic acid esters, alkylsulphonic acid esters of phenol, or phosphoric acid esters. Examples of thixotropic agents include pyrogenic hydrated silicas, polyamides, products derived from hydrogenated castor oil, and also polyvinyl chloride. Organotin compounds and amine catalysts can be cited as suitable catalysts for the curing reaction of the one- and two-component sealants of the present invention. Examples of organotin compounds include: dibutyltin diacetate, dibutyltin dilaurate, dibutyltin bis-acetoacetonate and tin carboxylates, such as tin octoate for example. The aforementioned tin catalysts can optionally be used in combination with amine catalysts.

EXAMPLES

The present invention is further illustrated, but is not to be limited, by the following examples. All quantities given in "parts" and "percents" are understood to be by weight, unless otherwise indicated. The following were used in the examples:

PREPOLYMER a silane-terminated polyurethane prepolymer which is the reaction product of a high molecular weight polyol and an isocyanatopropyltrimethoxysilane made according to U.S. Published Patent Application No. 2007/0055035;

PLASTICIZER benzyl butyl phthalate available from LANXESS as UNIMOL BB;

SILICA fumed silica treated with dimethyl silicone fluid to replace surface hydroxyl groups with a polydimethylsiloxane polymer, available from Cabot as CAB-O-SIL TS-720;

FILLER ground calcium carbonate, available from Imerys as DRIKALITE;

PIGMENT titanium dioxide pigment, available from Tronox as TRONOX, $TiO_2$;

CATALYST dibutyltin dilaurate, available from Air Products as DABCO T-12;

STABILIZER A a hindered amine light stabilizer ("HALS") available from Ciba Specialty Chemicals as TINUVIN 292;

STABILIZER B a UV stabilizer available from Ciba Specialty Chemicals as TINUVIN 1130;

WETTING AGENT available from Lanxess as BORCHI GEN DFN;

SEALANT A a commercial isocyanate-terminated prepolymer containing sealant available from Henkel Corp. as PL Self Leveling Concrete Crack Sealant; and SEALANT B a commercial isocyanate-terminated prepolymer containing sealant available from Sika as SIKAFLEX LM-15.

Example 1

Example 1 measured the effects of humidity on a commercial isocyanate-terminated prepolymer containing sealant and a silane-terminated prepolymer containing sealant. The commercial sealant (Sealant A above) was prepared from an isocyanate terminated prepolymer by the manufacturer and was used without modification. A silane-terminated prepolymer (formulation given in Table I) was compounded into a formulated sealant as follows. The components of the formulation were placed in a plastic FlackTek cup which was placed in a FlackTek Speed mixer. The formulation was blended at 1,800 rpm until it was homogeneous.

TABLE I

| Component | Weight (g) |
| --- | --- |
| PREPOLYMER | 70.5 |
| PLASTICIZER | 54.3 |
| FILLER | 165 |

TABLE I-continued

| Component | Weight (g) |
| --- | --- |
| STABILIZER A | 0.6 |
| STABILIZER B | 0.6 |
| WETTING AGENT | 1.8 |
| PIGMENT | 3.6 |
| CATALYST | 0.3 |

Samples of each of the moisture curing sealants were placed at one of four different humidity levels and the densities of the resulting elastomers were measured. A sample of each sealant was added to one of four aluminum pans until it was level with the top of the pan. Each pan was placed into one of four different humidity level environments to cure as follows. One sample of each sealant was placed in the laboratory at a measured humidity level of 40%. A second sample of each sealant was placed in a controlled 50% relative humidity level room. A third sample of each sealant was placed in a sealed one-gallon plastic bucket. The bucket contained a quart jar of water, simulating a 100% humidity level. The final sample of each sealant was allowed to cure under normal laboratory conditions for two hours and then submerged under water. The bucket was sealed so that the water could not evaporate. After allowing all of the samples to cure for three weeks, they were submitted for density determination The results are graphically illustrated in FIG. 1. The specific gravity of Sealant A was reported as 1.09828 by the manufacturer. This is equivalent to a density of 68.563 lbs/ft$^3$. The data in FIG. 1 clearly shows a lowering of the density when the sealant is in contact with water.

The isocyanate-terminated prepolymer containing sealant was much more sensitive to the humidity level than the silane-terminated prepolymer containing sealant. The data obtained was regraphed as FIG. 2 using the 50% relative humidity data as the standard. As can be appreciated, FIG. 2 clearly showed that the isocyanate-terminated prepolymer containing sealant was much more sensitive to the humidity level than was the silane-terminated prepolymer containing sealant. A low humidity condition lowered the density of the isocyanate-terminated prepolymer containing sealant by 12% versus the standard. A high humidity condition increased the density by 6% versus the standard. The isocyanate groups clearly reacted with water and created carbon dioxide gas. The carbon dioxide gas expanded the sealant and lowered its density.

The densities of the silane-terminated prepolymer containing sealant samples only varied by 1% in this example. The 1% variability in the densities of the sealants was most likely due to experimental error.

Example 2

This example evaluated moisture curing resins in a brick substrate. Three-hole bricks were used as a substrate to determine the crack filling properties of the different sealants. The bricks were prepared by placing them flat in an aluminum pan. The bottom inch of each hole was filled with uncured concrete which was allowed to set overnight, thus creating a large "bug hole." The bricks were soaked in water and after 24 hours, the bug holes were filled with one of the three sealants. The first hole was filled with Sealant A. The second hole was filled with Sealant B. The third hole was filled with the silane-terminated prepolymer containing sealant formulation given in Table II. The components in Table II were prepared into a formulated sealant. All of the components in Table II, except the silica, were placed in a plastic FlackTek cup. The cup was placed in a FlackTek Speed mixer and the contents blended at 1,800 rpm until homogeneous. The silica was added to the cup and the contents mixed again until homogeneous.

TABLE II

| Component | Weight (g) |
| --- | --- |
| PREPOLYMER | 94.0 |
| PLASTICIZER | 72.4 |
| FILLER | 220 |
| STABILIZER A | 0.8 |
| STABILIZER B | 0.8 |
| WETTING AGENT | 2.4 |
| PIGMENT | 4.8 |
| CATALYST | 0.4 |
| SILICA | 4.4 |

To evaluate the moisture curing prepolymers, the holes in the bricks were filled to excess with the three different sealants. The excess of each sealant was removed by pulling a tongue depressor across the top face of the brick. The sealants were flush with the top of the brick. The brick was placed into a pan of water which was not allowed to flow over the top of the brick.

All three sealants performed differently. No dimensional changes were observed in the silane-terminated prepolymer containing sealant. It did not expand and remained flush with the surface of the brick. Sealant A (an isocyanate-terminated prepolymer containing sealant), however, expanded and bulged out of the hole. Sealant A clearly reacted with the moisture and trapped carbon dioxide in the resin. Sealant B (another isocyanate-terminated prepolymer containing sealant) expanded only slightly.

Example 3

This example evaluated wet concrete pavers as a substrate for silane-terminated prepolymer containing sealants and isocyanate-terminated prepolymer containing sealants. Artificial bug holes were created in concrete pavers by drilling holes in the pavers with a high speed masonry bit. The diameters of the holes were 0.75 inch (0.75 inch depth), 0.5 inch (0.5 inch depth), 0.25 inch (0.75 inch depth), and 0.125 inch (0.5 inch depth). These concrete pavers were placed in water and allowed to soak overnight. The pavers were brushed to remove dirt and loose concrete. The concrete pavers were submerged in water until use. The holes in the concrete pavers were filled with Sealant A or the silane-terminated prepolymer containing formulation given in Table I. The pavers were placed into empty five-gallon pails, water was added to the pails but was not allowed to cover the tops of the pavers. After curing for 24 hours, Sealant A expanded out of the holes. The silane-terminated prepolymer containing sealant did not expand and stayed level in three out of four holes. The resin in the smallest hole was raised. The inventor herein speculates that the resin did not fully fill the hole and the trapped air forced the resin out of the hole.

Example 4

This example evaluated whether there were any effects of post-coating the sealant formulations with a fast setting polyurethane coating. Predrilled holes in three pavers were filled with the silane-terminated prepolymer containing sealant and Sealant A. The sealants in two of the pavers were allowed to cure for 24 hours before applying a polyurethane coating. After the 24 hour period, it appeared that any sealant that was going to foam had already bulged out of the hole. One set of sealants was allowed to cure for only one hour before post-coating. A commercial polyurethane spray coating (BAYTEC SPR-156 D from Bayer MaterialScience) was applied to some of the pavers with a Glass Craft variable ratio plural component spray machine. The data for each of the three bricks is summarized in Tables III, IV and V.

Overall, the data in Tables III, IV and V showed that the silane-terminated prepolymer containing sealants were not affected by the water in the concrete. The isocyanate-terminated prepolymer containing sealant (Sealant A) reacted with the water in the concrete which caused the sealant to expand.

The data in Tables III, IV and V also shows that the isocyanate-terminated prepolymer containing sealants expanded in the first 24 hours. Post-coating the raised sealant did not hide the defect. The sealant defect "read through" the coating in most cases. Coating the isocyanate-terminated prepolymer containing sealant after one hour of cure, did not stop it from reacting with water. When the isocyanate-terminated prepolymer containing sealant reacted with water, $CO_2$ gas was released which expanded the filler and created a defect in the coating. This effect can be seen in the data from paver number 3 in Table V.

TABLE III

| Paver No. | Hole size (in.) | Hole filler (prepolymer) | Time before spray (hrs) | Initial (at spray time) | 1 hour after spray | 5 hours after spray | 24 hours after spray | 96 hours after spray |
|---|---|---|---|---|---|---|---|---|
| 1 | 0.125 | NCO | 24 | flat | flat | flat | flat | flat |
| 1 | 0.125 | STP | 24 | flat | flat | flat | flat | flat |
| 1 | 0.25 | NCO | 24 | raised | raised | raised | raised | raised |
| 1 | 0.25 | STP | 24 | flat | flat | flat | flat | flat |
| 1 | 0.375 | NCO | 24 | raised | raised | raised | raised | raised |
| 1 | 0.375 | STP | 24 | flat | flat | flat | flat | flat |
| 1 | 0.5 | NCO | 24 | raised | raised | raised | raised | raised |
| 1 | 0.5 | STP | 24 | flat | flat | flat | flat | flat |

TABLE IV

| Paver No. | Hole size (in.) | Hole filler (prepolymer) | Time before spray (hrs) | Initial (at spray time) | 1 hour after spray | 5 hours after spray | 24 hours after spray | 96 hours after spray |
|---|---|---|---|---|---|---|---|---|
| 2 | 0.125 | NCO | 24 | slightly raised | flat | flat | flat | flat |
| 2 | 0.125 | STP | 24 | flat | flat | flat | flat | flat |
| 2 | 0.25 | NCO | 24 | raised | raised | raised | raised | raised |
| 2 | 0.25 | STP | 24 | raised | raised | raised | raised | raised |
| 2 | 0.375 | NCO | 24 | raised | raised | raised | raised | raised |
| 2 | 0.375 | STP | 24 | flat | flat | flat | flat | flat |
| 2 | 0.5 | NCO | 24 | raised | raised | raised | raised | raised |
| 2 | 0.5 | STP | 24 | flat | flat | flat | flat | flat |

TABLE V

| Paver No. | Hole size (in.) | Hole filler (prepolymer) | Time before spray (hrs) | Initial (at spray time) | 1 hour after spray | 5 hours after spray | 24 hours after spray | 96 hours after spray |
|---|---|---|---|---|---|---|---|---|
| 3 | 0.125 | NCO | 1 | flat | flat | raised | flat | flat |
| 3 | 0.125 | STP | 1 | flat | flat | flat | flat | flat |
| 3 | 0.25 | NCO | 1 | flat | raised | raised | raised | raised |
| 3 | 0.25 | STP | 1 | flat | flat | flat | flat | flat |
| 3 | 0.375 | NCO | 1 | flat | raised | raised | raised | raised |
| 3 | 0.375 | STP | 1 | flat | flat | flat | flat | flat |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for repairing concrete comprising:
   filling one of a surface void, gap or seam in the concrete with a polyurethane sealant comprising,
      a silane terminated prepolymer ("STP"), and
      a catalyst,
      optionally, one or more of plasticizers, fillers, pigments, drying agents, light stabilizers, antioxidants, thixotropic agents and bonding agents; and
   applying an isocyanate-terminated prepolymer containing polyurethane or polyurea coating to the silane terminated prepolymer polyurethane sealant.

2. The process according to claim 1, wherein the concrete is wet.

3. The process according to claim 1, wherein the concrete is in an environment having a relative humidity of at least 40%.

4. The process according to claim 1, wherein the concrete is in an environment having a relative humidity of at least 50%.

5. The process according to claim 1, wherein the concrete is in an environment having a relative humidity of at least 90%.

6. The process according to claim 1, wherein the concrete is in an environment having a relative humidity of 100%.

7. The process according to claim 1, wherein the concrete is under water.

8. The process according to claim 1, wherein the isocyanate-terminated prepolymer containing coating is a polyurethane.

9. The process according to claim 1, wherein the isocyanate-terminated prepolymer containing coating is a polyurea.

10. A process for repairing concrete comprising:
    filling one of a surface void, gap or seam in the concrete with a polyurethane sealant comprising,
       a silane terminated prepolymer ("STP"), and
       a catalyst,
       optionally, one or more of plasticizers, fillers, pigments, drying agents, light stabilizers, antioxidants. thixotropic agents and bonding agents;
    allowing the polyurethane sealant to cure; and
    applying an isocyanate-terminated prepolymer containing polyurethane or polyurea coating to the cured silane terminated prepolymer polyurethane sealant.

11. The process according to claim 10, wherein the concrete is wet.

12. The process according to claim 10, wherein the concrete is in an environment having a relative humidity of at least 40%.

13. The process according to claim 10, wherein the concrete is in an environment having a relative humidity of at least 50%.

14. The process according to claim 10, wherein the concrete is in an environment having a relative humidity of at least 90%.

15. The process according to claim 10, wherein the concrete is in an environment having a relative humidity of 100%.

16. The process according to claim 10, wherein the concrete is under water.

17. The process according to claim 10, wherein the isocyanate-terminated prepolymer containing coating is a polyurethane.

18. The process according to claim 10, wherein the isocyanate-terminated prepolymer containing coating is a polyurea.

* * * * *